Figure 1:
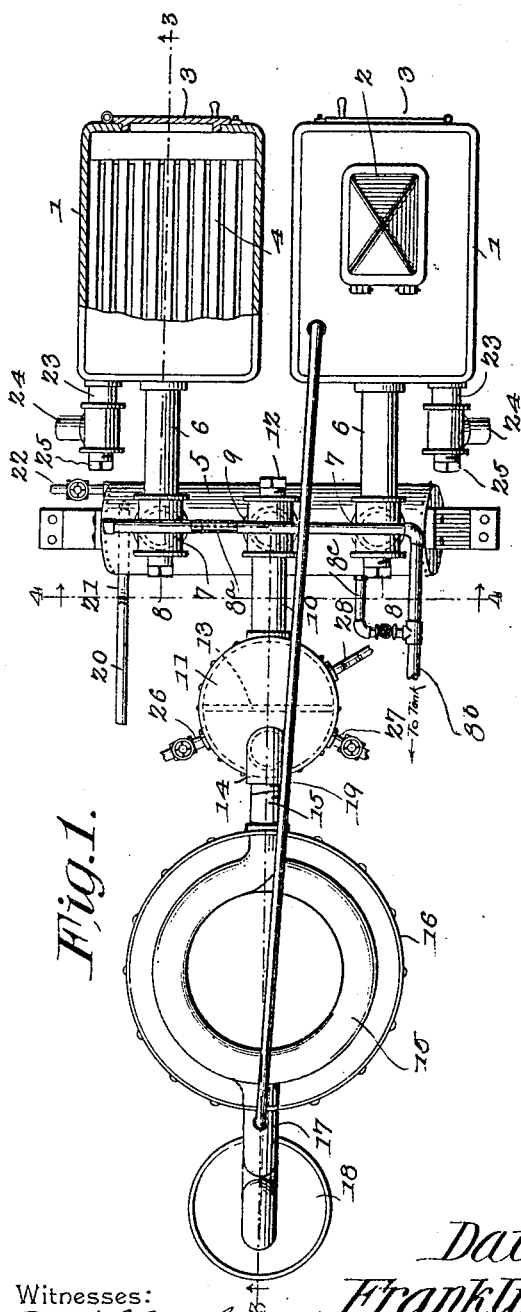

No. 821,887. PATENTED MAY 29, 1906.
D. M. ROSS & F. T. EDWARDS.
TURPENTINE STILL.
APPLICATION FILED NOV. 11, 1904.

2 SHEETS—SHEET 1.

Witnesses:
E. F. Stewart
R. M. Elliott

David M. Ross
Franklin T. Edwards, Inventors,
by C. A. Snow & Co.
Attorneys.

No. 821,887. PATENTED MAY 29, 1906.
D. M. ROSS & F. T. EDWARDS.
TURPENTINE STILL.
APPLICATION FILED NOV. 11, 1904.

2 SHEETS—SHEET 2

This is more of a kiln process than a still process. The kilns,1,1,being filled with wood,a fire is kindled in,4,4: Vapors pass thro 6,6,to descend in,7,7,to separator,5,containing water:thence they rise through 9,pass by 10 to purifier,13, where

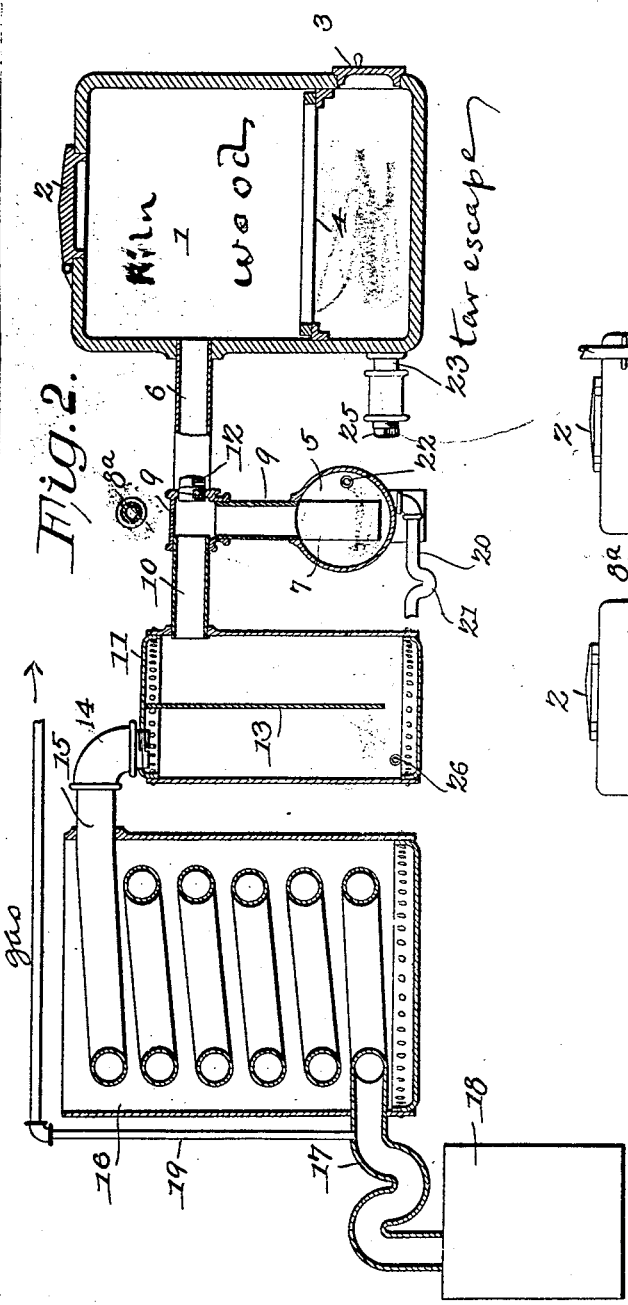

Fig.2.

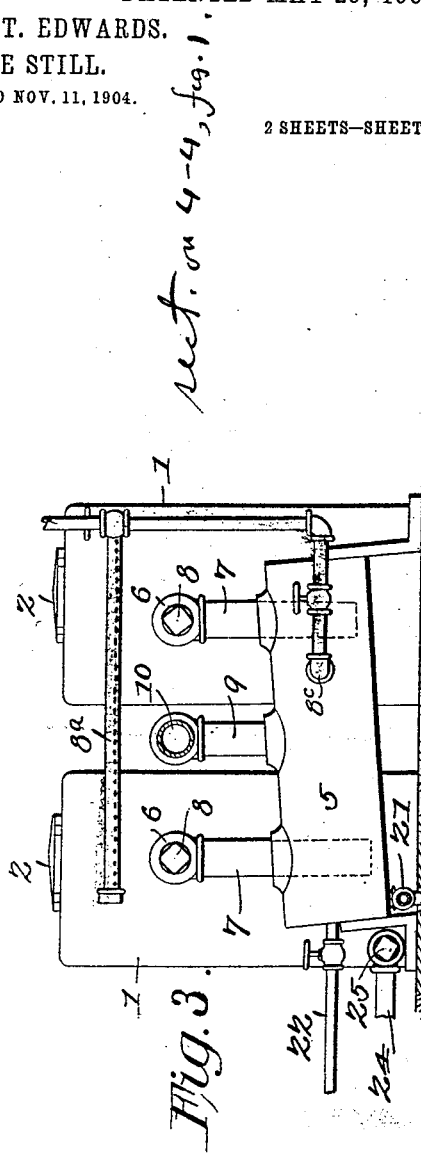

Fig.3.

rect. on 4-4,fig.1.

they are washed with water. The separator,5,is chilled by water from spray-pipe,8a. The branch pipe,8c,supplies water to the separator. The tarry matters and creosote are removed by the separators; the other matters pass to coil.

Witnesses:
E. F. Stewart
R. M. Elliott

David M. Ross
and
Franklin T. Edwards, Inventors
by C. A. Snow & Co.
Attorneys.

UNITED STATES PATENT OFFICE.

DAVID MORROW ROSS AND FRANKLIN THOMAS EDWARDS, OF FLETCHER, GEORGIA.

TURPENTINE-STILL.

No. 821,887.   Specification of Letters Patent.   Patented May 29, 1906.

Application filed November 11, 1904. Serial No. 232,344.

*To all whom it may concern:*

Be it known that we, DAVID MORROW ROSS and FRANKLIN THOMAS EDWARDS, citizens of the United States, residing at Fletcher, in the county of Irwin and State of Georgia, have invented a new and useful Turpentine-Still, of which the following is a specification.

This invention relates to turpentine-stills.

The object of the invention is in a ready and practical manner to free the turpentine from creosote, pyroligneous acid, tarry matter, and other substances present which affect its color, materially reduce its market value, and under some conditions render it unfit for use.

With the above and other objects in view, as will appear as the nature of the invention is better understood, the same consists in the novel construction and arrangement of parts of a turpentine-still, as hereinafter fully described and claimed.

In the accompanying drawings, forming a part of this specification, and in which like characters of reference indicate corresponding parts, Figure 1 is a view in plan of one form of apparatus. Fig. 2 is a vertical longitudinal sectional view taken on the line 3 3, Fig. 1, and looking in the direction of the arrow thereon. Fig. 3 is a vertical transverse sectional view taken on the line 4 4, Fig. 1, and looking in the direction of the arrow thereon.

The apparatus shown in Fig. 1 embodies two kilns 1, each a counterpart of the other, and each being provided at its top with a charging-door 2, at its rear lower side with a cleaning-out door 3, and near its bottom with a grate 4 of the usual or any preferred construction. Located adjacent to the kilns is a cylindrical drum 5, constituting a separator, as it is in this part of the apparatus that the bulk of the creosote, pyroligneous acid, and tarry matter are removed from the turpentine. Connecting each of the kilns with the separator is a pipe 6, with each of which connects a vertically-disposed branch pipe 7, tapped into the separator, the outer ends of the pipes 6 being closed by threaded plugs 8 to permit access to their interior for the purpose of cleaning when necessary. The branch pipes 7 extend close to the lower side of the separator, thus to cause the vapors passing through them to impinge on its walls to effect precipitation of the creosote, &c., before escaping. Precipitation of the tarry and other substances is secured by chilling the separator, and this is effected by a perforated pipe $8^a$, which connects with a pipe $8^b$, leading from a tank or other source of water-supply. The water escaping from the pipe $8^a$ and onto the separator chills it, and thus effects condensation of the tarry and other matters. For supplying water to the separator for the purpose of washing the vapors entering thereto and for cleansing the separator when necessary there is a valved branch pipe $8^c$ coupled with the pipe $8^a$ and entering the separator-shell. The vapors that have been separated from the tarry and other matters pass upward through a pipe 9, which connects a branch pipe 10, leading to a purifier 11, the outer end of the latter pipe being closed by a threaded plug 12 for the purpose of permitting cleansing when necessary. The pipe 9 is provided to catch the vapors and convey them to the purifier, where any remaining acid and creosote are removed. This purifier is a drum-like structure and has connected to its top a baffle-plate 13, which extends to a point near the bottom of the same and operates to cause the vapors to traverse a tortuous path before escaping, thus to insure proper cleaning of the product. Connecting with the purifier on the side of the baffle-plate 13 opposite that at which the pipe 10 enters is a threaded coupling 14, which connects with one end of a worm 15, disposed within a water-tank 16, as usual, the other end of the worm being projected through the lower portion of the tank and provided with a trap 17, the condensed turpentine flowing through the trap being caught by a suitable receptacle 18. In the worm there will be present a greater or less amount of gas which does not contain turpentine, and this is led from the worm to one of the kilns by a pipe 19 and is there consumed. The heavier products—such as creosote, tar, &c.—and the acid are separated out of the turpentine in the separator and escape through a pipe 20, tapped into its bottom near one end, the separator being disposed on an incline to cause the substances to be fed by gravity to the pipe, and the latter is provided with a gooseneck-seal 21 to prevent escape of the gaseous by-products under the normal pressure. The separator is further provided with a valved waste-pipe 22 to carry off the water supplied by the pipe $8^c$.

As is common in all destructive distillation plants, there will always be an accumulation of tar and other products at the bottom of the kiln, and in order to remove this escape-pipes 23 are provided, which pass within the kiln either at or near its bottom and connect with pipes 24, through which the material may escape, the pipes being provided with threaded plugs 25 to permit of the pipes 23 being cleansed when requisite.

The purifier is provided with two valved pipes 26 and 27, the former being connected with a tank, (not shown,) and supplies water to the purifier for cleansing when necessary, and the latter being employed as a waste-pipe. The purifier is also provided near its bottom with a gooseneck-pipe 28, which will permit the water supplied by the pipe $8^c$ gradually to escape, thus to maintain a predetermined level at all times.

The action of the apparatus thus far described is as follows: The doors 2 being open, wood in any suitable quantity is supplied to the kilns, and when ignition is fully established the doors are shut. As the vapors from the wood rise they pass through pipes 6 and 7 to the separator, thence through the water therein, which step causes the initial separation of the bulk of the acids, creosote, tar, &c., and effects partial purification of the vapors. These latter then pass through the pipe 10 into the purifier proper, where by coming into contact with clean water the vapors are washed and the acid removed, after which they escape to the worm 15 and are condensed and fall into the receptacle 18. When all of the products have been distilled from the wood, the doors 3 are opened, the charcoal removed, and the furnace again charged for use.

It will be seen from the foregoing description that although the parts of this invention are exceedingly simple in construction they combine in a practical manner all of the essentials requisite to the production of a thoroughly-operative device.

Having thus described the invention, what is claimed is—

In a distillation plant, the combination with a pair of kilns, of an inclined separator adjacent thereto, a pipe connecting with each of the kilns and projecting downward into the separator close to its bottom, spraying means coacting with the separator, a purifier containing a baffle, a pipe connecting with the upper side of the separator intermediate of its ends and communicating with the upper portion of the purifier on one side of the baffle, and a condensing-coil communicating with the purifier on the other side of the baffle.

In testimony that we claim the foregoing as our own we have hereto affixed our signatures in the presence of two witnesses.

DAVID MORROW ROSS.
FANKLIN THOMAS EDWARDS.

Witnesses:
R. T. MAULDIN,
ARCHIE FOUNTAIN.